United States Patent
Nakamoto et al.

(10) Patent No.: US 9,732,221 B2
(45) Date of Patent: Aug. 15, 2017

(54) REINFORCED THERMOPLASTIC RESIN COMPOSITION AND MOLDED ARTICLE

(71) Applicant: UMG ABS, LTD., Tokyo (JP)

(72) Inventors: Masahito Nakamoto, Ube (JP); Hideichiro Kawaguchi, Ube (JP)

(73) Assignee: UMG ABS, LTD., Tokyo (JP)

( * ) Notice: Subject to any disclaimer, the term of this patent is extended or adjusted under 35 U.S.C. 154(b) by 0 days.

(21) Appl. No.: 15/304,075

(22) PCT Filed: Mar. 18, 2015

(86) PCT No.: PCT/JP2015/058042
§ 371 (c)(1),
(2) Date: Oct. 14, 2016

(87) PCT Pub. No.: WO2015/163049
PCT Pub. Date: Oct. 29, 2015

(65) Prior Publication Data
US 2017/0037244 A1 Feb. 9, 2017

(30) Foreign Application Priority Data
Apr. 21, 2014 (JP) .................. 2014-087530

(51) Int. Cl.
| | |
|---|---|
| *H01B 3/40* | (2006.01) |
| *C08L 63/00* | (2006.01) |
| *C08G 73/10* | (2006.01) |
| *C08L 69/00* | (2006.01) |
| *C08K 3/04* | (2006.01) |
| *C08L 55/02* | (2006.01) |
| *C08L 77/00* | (2006.01) |

(52) U.S. Cl.
CPC ............... *C08L 69/00* (2013.01); *C08K 3/04* (2013.01); *C08L 55/02* (2013.01); *C08L 77/00* (2013.01); *C08L 2201/02* (2013.01); *C08L 2205/035* (2013.01); *C08L 2205/06* (2013.01)

(58) Field of Classification Search
CPC .......... C08L 69/00; C08L 55/02; C08L 77/00; C08L 2201/02; C08L 2205/035; C08L 2205/06; C08K 3/04
USPC ........ 523/435, 436, 451, 468, 466; 525/529, 525/523, 540
See application file for complete search history.

(56) References Cited

U.S. PATENT DOCUMENTS 5,538,784 A * 7/1996 Subramanian ...... B29C 45/0001
264/109
2008/0119631 A1* 5/2008 Mullen ................ C08L 69/005
528/203

FOREIGN PATENT DOCUMENTS

| CN | 101759981 A | 6/2010 |
|---|---|---|
| CN | 102007183 A | 4/2011 |
| JP | 60088062 A | 5/1985 |
| JP | 01170635 A | 7/1989 |
| JP | 03017151 A | 1/1991 |
| JP | 06-049344 A | 2/1994 |
| JP | 2001240738 A | 9/2001 |
| JP | 2002020606 A | 1/2002 |
| JP | 2007039489 A | 2/2007 |
| JP | 2009155576 A | 7/2009 |
| JP | 2011231283 A | 11/2011 |
| JP | 2013014747 A | 1/2013 |
| WO | 2011037172 A1 | 3/2011 |

OTHER PUBLICATIONS

Dow Plastics, "D.E.R. 667", Dec. 2000.*
Hexion, "EPON TM Resin 1007F", Sep. 2007.*
Hexion, "EPON TM Resin 1009F", Sep. 2007.*
International Search Report dated Apr. 14, 2015 in PCT Patent Application No. PCT/JP2015/058042.
Notice of Allowance issued Oct. 31, 2016 in Korean Patent Application No. 10-2016-7027317, and English Translation thereof.
Office Action dated Mar. 3, 2017 in Chinese Patent Application No. 201580020417.7, and Partial English Translation thereof.

* cited by examiner

*Primary Examiner* — David Karst
(74) *Attorney, Agent, or Firm* — Plumsea Law Group, LLC

(57) ABSTRACT

A reinforced thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1); an inorganic filler (D); a glycidyl ether unit-containing polymer (E) that has a glycidyl ether unit and has the mass average molecular weight of 3,800 to 60,000; and a specific amount of a polyamide (F) that has a moisture percentage of 0.1% by mass or less.

7 Claims, No Drawings

REINFORCED THERMOPLASTIC RESIN COMPOSITION AND MOLDED ARTICLE

CROSS-REFERENCE TO RELATED APPLICATION(S)

This application is the U.S. National Phase application of PCT application number PCT/JP2015/058042 having a PCT filing date of Mar. 18, 2015, which claims priority of Japanese patent application 2014-087530 filed on Apr. 21, 2014, the disclosures of which are hereby incorporated by reference.

TECHNICAL FIELD

The present invention relates to a thermoplastic resin composition reinforced by an inorganic filler, and a molded article using thereof.

Priority is claimed on Japanese Patent Application No. 2014-087530, filed on Apr. 21, 2014, the content of which is incorporated herein by reference.

BACKGROUND OF RELATED ART

As a raw material for housing of mobile devices (such as notebook-type or tablet-type personal computers, mobile phones such as smartphones, digital cameras, digital video cameras), a thermoplastic resin composition (such as ABS resin, polycarbonate resin/ABS resin, polyamide resin), or a composition in which the thermoplastic resin composition has been reinforced by an inorganic filler are widely used.

As a method of manufacturing a housing, in general, a method of molding the thermoplastic resin composition by injection molding by which the shape of housing can be freely molded to some extent is applied.

Recently, with respect to the housing of mobile devices, a characteristic for making more thinner housing, a characteristic for satisfactorily enduring impact or load when the housing is present in a bag, and a characteristic for providing unpainted housing to reduce cost are demanded. In order to satisfy these demands, with respect to the thermoplastic resin composition used in a housing, high weld strength and heat resistance, and excellent moldability during molding are required as well as high rigidity and mechanical strength (impact resistance) of a molded article.

However, thermoplastic resin composition such as ABS resin, polycarbonate resin/ABS resin or polyamide resin, which has not been reinforced by an inorganic filler, show low rigidity, and therefore, the demand for a thinned housing cannot be realized. Since polyamide resins have high moisture absorbency, warpage and dimensional change and deterioration in appearance over time is likely to occur after molding.

Thus, as a thermoplastic resin composition used for a housing, a reinforced thermoplastic resin composition in which rigidity of ABS resin or polycarbonate resin/ABS resin is enhanced by adding an inorganic filler such as glass fibers or carbon fibers has been studied.

Although the reinforced thermoplastic resin composition containing ABS resin or polycarbonate resin/ABS resin as a main component has high rigidity and can realize a thinned housing, weld strength and impact strength of the molded article is insufficient. Although the reinforced thermoplastic resin composition containing polyamide resin as a main component exhibits excellent weld strength when a molded article is molded, the problem with respect to warpage cannot be solved. The problem is caused by moisture absorbency of the molded article after molding, and a solution based on the molded raw material has not been proposed.

As a reinforced thermoplastic resin capable of providing a molded article having high impact resistance, the following compositions have been proposed.

(1) A reinforced thermoplastic resin composition containing an aromatic polycarbonate resin, a graft copolymer, a glass fiber in which the surface thereof has been treated with a water-soluble polyurethane, a glycidyl ether unit-containing polymer and a phosphoric acid ester-type flame retardant (Patent Document 1)

(2) A reinforced thermoplastic resin composition containing an aromatic polycarbonate resin, a fiber-type filler in which the surface thereof has been treated with polyamide and a lubricant having a carboxyl group (Patent Document 2)

As a reinforced thermoplastic resin capable of providing a molded article having excellent mechanical strength, the following compositions have been proposed.

(3) A reinforced thermoplastic resin composition containing an aromatic polycarbonate resin, a thermoplastic polyester resin, a thermoplastic elastomer, and a glass fiber in which the surface thereof has been treated with a silane coupling agent and an epoxy resin (Patent Document 3)

(4) A reinforced thermoplastic resin composition containing a polycarbonate resin, a rubber containing polymer, and a carbon fiber converged in nylon-based convergence agent (Patent Document 3).

PRIOR ART DOCUMENTS

Patent Documents

Patent Document 1: Japanese Unexamined Patent Application, First Publication No. 2013-14747
Patent Document 2: Japanese Unexamined Patent Application, First Publication No. 2001-240738
Patent Document 3: Japanese Unexamined Patent Application, First Publication No. Hei6-49344
Patent Document 4: Japanese Unexamined Patent Application, First Publication No. Sho 60-88062

SUMMARY OF THE INVENTION

Disclosure of the Invention

Problems to be Solved by the Invention

However, the reinforced thermoplastic resin composition of (1) is insufficient in weld strength after molding a molded article.

The reinforced thermoplastic resin composition of (2) has a problem that mechanical strength other than impact resistance of the molded article is deteriorated.

The reinforced thermoplastic resin composition of (3) or (4) is insufficient in impact resistance of the molded article.

Further, other than the reinforced thermoplastic resin compositions of (1) to (4), in terms of improving mechanical strength of the molded article, many reinforced thermoplastic resin compositions containing an epoxy compound have been proposed.

However, a reinforced thermoplastic resin composition which exhibits excellent moldability and balance of weld strength, mechanical strength and impact resistance of the molded article has not been proposed.

The present invention has an object to provide a reinforced thermoplastic resin composition that has excellent moldablity and enhances weld strength, rigidity, impact resistance, mechanical strength, heat resistance of a molded article to be obtained, and to provide a molded article having high weld strength, rigidity, impact strength, mechanical strength and heat resistance.

Means for Solving the Problems

The present invention includes the following aspects.

[1] A reinforced thermoplastic resin composition comprising:
a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1), provided that the total amount of the polycarbonate resin (A) and the graft copolymer (B) is 100% by mass;
an inorganic filler (D);
a glycidyl ether unit-containing polymer (E) that has a glycidyl ether unit and has the mass average molecular weight of 3,800 to 60,000, provided that the graft copolymer (B) is excluded from the definition of the glycidyl ether unit-containing polymer (E); and
a polyamide (F) that has a moisture percentage of 0.1% by mass or less; wherein
the amount of the inorganic filler (D) with respect to 100% by mass of the reinforced thermoplastic resin composition is 20 to 50% by mass;
the amount of the glycidyl ether unit-containing polymer (E) with respect to 100 parts by mass of the resin main component (C) is 1 to 10 parts by mass; and
the amount of the polyamide (F) with respect to 100 parts by mass of the resin main component (C) is 1 to 15 parts by mass.

[2] The reinforced thermoplastic resin composition according to [1], wherein
a relative viscosity of the polyamide (F) is 1.5 to 4.5.

[3] The reinforced thermoplastic resin composition according to [1] or [2], wherein the inorganic filler (D) is a carbon fiber.

[4] The reinforced thermoplastic resin composition according to [1] or [2], wherein the inorganic filler (D) is a glass fiber.

[5] The reinforced thermoplastic resin composition according to any one of [1] to [4], further containing a phosphoric acid ester-type flame retardant (G).

[6] The reinforced thermoplastic resin composition according to [5], wherein the mass average molecular weight of the phosphoric acid ester-type flame retardant (G) is greater than 326.

[7] A molded article obtainable by molding the reinforced thermoplastic resin composition of any one of [1] to [6].

Effect of the Invention

The reinforced thermoplastic resin composition of the present invention exhibits excellent moldability, and enhances weld strength, rigidity, impact resistance, mechanical strength, heat resistance of the molded article to be obtained.

The molded article of the present invention has high weld strength, rigidity, impact strength, mechanical strength, and heat resistance.

PREFERRED EMBODIMENTS OF THE INVENTION

Hereinafter, the present invention will be described in detail.

The term "(meth)acrylate refers to a generic term for an acrylate or a methacrylate.

The term "molded articles" refers to an articles formed from the reinforced thermoplastic resin composition of the present invention by molding.

Reinforced Thermoplastic Resin Composition

The reinforced thermoplastic resin composition of the first aspect of the present invention includes: a resin main component (C) containing a polycarbonate resin (A) described later as an essential component; an inorganic filler (D); a glycidyl ether unit-containing polymer (E); and a polyamide as essential components; and if necessary, a graft copolymer (B). It is preferable that the reinforced thermoplastic resin composition further includes phosphoric acid ester-type flame retardant (G), and flame retardant auxiliary agent (H).

<Polycarbonate Resin (A)>

The polycarbonate resin (A) is a resin obtained from a dihydroxydiarylalkane. The polycarbonate resin (A) may be optionally branched.

One type of these polycarbonate resins (A) may be used alone, or two or more types thereof may be used in combination.

Production Method of Polycarbonate Resin (A)

The polycarbonate resin (A) is produced by a known method. For example, this can be produced through a method of reacting a dihydroxy or polyhydroxy compound with phosgene or a carbonate diester, or through a melt polymerization method. As the dihydroxydiarylalkane, for example, those having an alkyl group at the ortho position relative to the hydroxy group may be used. Specific examples of preferred dihydroxydiarylalkanes include 4,4'-dihydroxy 2,2'-diphenylpropane (that is, bisphenol A), tetramethyl bisphenol A and bis-(4-hydroxyphenyl)-p-diisopropylbenzene.

The branched polycarbonate resin (A) can be produced by substituting a portion, for example, 0.2 to 2 mol %, of the dihydroxy compounds with a polyhydroxy compound. Specific examples of the polyhydroxy compound include phloroglucinol, 4,6-dimethyl-2,4,6-tri-(4-hydroxyphenyl)-heptene, 4,6-dimethyl-2,4,6-tri-(4-hydroxyphenyl)-heptane and 1,3,5-tri-(4-hydroxyphenyl)-benzene.

In addition, even those recycled from compact discs or the like can also be used as a polycarbonate resin (A).

Viscosity Average Molecular Weight of Polycarbonate Resin (A)

The viscosity average molecular weight (Mv) of the polycarbonate resin (A) is preferably from 15,000 to 35,000. If the viscosity average molecular weight of the polycarbonate resin (A) is 15,000 or higher, the impact resistance of the molded article will be improved. If the viscosity average molecular weight of the polycarbonate resin (A) is 35,000 or lower, the moldability of the reinforced thermoplastic resin composition will be improved.

In addition, the viscosity average molecular weight (Mv) of the polycarbonate resin (A) is more preferably from 17,000 to 25,000, as such a range offers a particularly superior balance of the mechanical strengths and the impact strength of the molded article and the fluidity of the reinforced thermoplastic resin composition.

The viscosity average molecular weight of the polycarbonate resin (A) can be determined by a solution viscosity method. When the commercially available polycarbonate resin (A) is used, the value of the viscosity average molecular weight recited in a catalogue can be applied.

Amount of Polycarbonate Resin (A)

The amount of the polycarbonate resin (A) with respect to the total mass of the resin main component (C) (100% by mass) is 50 to 100% by mass, and preferably 80 to 95% by mass. When the amount of polycarbonate resin (A) is equal or more than 50% by mass, impact strength of the molded article is enhanced. When the amount of the polycarbonate resin (A) is equal or less than 95% by mass, moldability of the reinforced thermoplastic resin composition is further improved.

<Graft Copolymer (B)>

The graft copolymer (B) is a copolymer obtained by graft-polymerizing a monomer mixture including an aromatic alkenyl compound monomer (a) and a vinyl cyanide compound monomer (b) in the presence of a rubber polymer (B1) such that a molecular chain (B2) containing an aromatic alkenyl compound monomer (a) unit and a vinyl cyanide compound monomer (b) unit is grafted onto the rubber polymer (B1).

The graft copolymer (B) may be used alone, or two or more types thereof may be used in combination.

Rubber Polymer (B1)

Examples of the rubber polymer (B1) include a butadiene rubber, a styrene-butadiene rubber, an acrylonitrile-butadiene rubber, an isoprene rubber, a chloroprene rubber, a butyl rubber, an ethylene-propylene rubber, an acryl rubber, an ethyl ene-propyl ene-nonconjugated diene rubber, an epichlorohydrin rubber, a diene-acrylic composite rubber, and a silicone (polysiloxane)-acrylic composite rubber. Among these, a butadiene rubber, a styrene-butadiene rubber, an acrylonitrile-butadiene rubber, an acrylic rubber, a diene-acrylic composite rubber and a silicone-acrylic composite rubber are preferred as they provide excellent plating properties of the molded article.

Further, a silicone-acrylic composite rubber is more preferred, as it provides excellent frame retardancy of the molded article.

(Diene-Acrylic Composite Rubber)

The diene component of the diene-acrylic composite rubber contains at least 50% by mass of butadiene units. Specific examples thereof include a butadiene rubber, a styrene-butadiene rubber and an acrylonitrile-butadiene rubber.

The acrylic rubber component in the diene-acrylic composite rubber is prepared by polymerization between an alkyl (meth)acrylate (f) and a polyfunctional monomer (g).

Examples of the alkyl (meth)acrylate (f) include alkyl acrylates such as methyl acrylate, ethyl acrylate, n-propyl acrylate, n-butyl acrylate and 2-ethylhexyl acrylate; and alkyl methacrylates such as hexyl methacrylate, 2-ethylhexyl methacrylate and n-lauryl methacrylate. One type of these may be used alone, or two or more types thereof may be used in combination.

Examples of the polyfunctional monomer (g) include allyl methacrylate, ethylene glycol dimethacrylate, propylene glycol dimethacrylate, 1,3-butylene glycol dimethacrylate, 1,4-butylene glycol dimethacrylate, triallyl cyanurate and triallyl isocyanurate. One type of the polyfunctional monomer (g) may be used alone, or two or more types thereof may be used in combination.

Examples of the composite structure of the diene-acrylic composite rubber include a core shell structure in which the periphery of a core layer of a diene-based rubber component is covered by an acrylic rubber component, a core shell structure in which the periphery of a core layer of an acrylic rubber component is covered by a diene-based rubber component, a structure in which a diene-based rubber component and an acrylic rubber component are intertwined with each other, and a copolymer structure in which diene-based monomers and alkyl (meth)acrylate-based monomers are randomly arranged.

(Silicone-Acrylic Composite Rubber)

The silicone component of the above silicone-acrylic composite rubber is mainly composed of a polyorganosiloxane. Of these, a polyorganosiloxane containing a vinyl polymerizable functional group is preferred.

The acrylic rubber component in the silicone-acrylic composite rubber is the same as the acrylic rubber component of the diene-acrylic composite rubber.

Examples of the composite structure of the silicone-acrylic composite rubber include a core shell structure in which the periphery of a core layer of a silicone component is covered by an acrylic rubber component, a core shell structure in which the periphery of a core layer of an acrylic rubber component is covered by a silicone rubber component, a structure in which a silicone component and an acrylic rubber component are intertwined with each other, and a structure in which polyorganosiloxane segments and polyalkyl (meth)acrylate segments are linearly and sterically bound to each other to form a network-like rubber structure.

(Production Method of Rubber Polymer (B1))

The rubber polymer (B1) is prepared by, for example, treating the monomers constituting the rubber polymer (B1) with a radical polymerization initiator to effect emulsion polymerization. According to the preparation method by emulsion polymerization, the particle size of the rubber polymer (B1) can be readily controlled.

The average particle size of the rubber polymer (B1) is preferably from 0.1 to 0.6 μm as the impact resistance of the molded article can be improved. The average particle size can be measured in accordance with a dynamic light scattering method.

(Amount of Rubber Polymer (B1))

In addition, the content of the rubber polymer (B1) is preferably from 0.5 to 3.5% by mass, and more preferably from 5 to 10% by mass, relative to 100% by mass of the main resin component (C). If the amount of the rubber polymer (B1) is at least 0.5% by mass, the impact resistance of the molded article can be improved. If the amount is not more than 3.5% by mass, the moldability will be improved, and consequently, the molded article will have an excellent outer appearance.

Molecular Chain (B2)

The molecular chain (B2) includes the aromatic alkenyl compound monomer (a) unit and the vinyl cyanide compound monomer (b) unit as essential components and other monomer (c) unit copolymerizable with these units as an optional component. It is preferable such that the aromatic alkenyl compound monomer (a) unit accounts for 50 to 90% by mass, the vinyl cyanide compound monomer (b) unit accounts for 10 to 50% by mass, and the other monomer (c) unit accounts for 0 to 40% by mass (provided that the total amount of (a), (b), and (c) accounts for 100% by mass), and that the ratio offers an excellent balance between the impact resistance of the molded article and the moldability of the reinforced thermoplastic resin composition.

Examples of the aromatic alkenyl compound monomer (a) include styrene, α-methylstyrene and vinyltoluene, and styrene is preferred.

Examples of the vinyl cyanide compound monomer (b) include acrylonitrile and methacrylonitrile, and acrylonitrile is preferred.

Examples of the other monomer (c) include alkyl methacrylate (such as methyl methacrylate, ethyl methacrylate and 2-ethylhexyl methacrylate), alkyl acrylate (such as methyl acrylate, ethyl acrylate and butyl acrylate), and maleimide compounds (such as N-phenylmaleimide).

Acetone-Insoluble Fraction and Acetone-Soluble Fraction of Graft Copolymer (B)

It is preferable that the graft copolymer (B) contain 70 to 99% by mass of an acetone-insoluble fraction, and also the reduced viscosity of an acetone-soluble fraction measured in a 0.2 g/dl N,N-dimethylformamide solution at 25° C. is 0.3 to 0.7 dl/g. If the acetone-insoluble fraction accounts for at least 70% by mass, the outer appearance of the molded product and the moldability of the reinforced thermoplastic resin composition will be further improved. On the other hand, if the acetone-insoluble fraction accounts for 99% by mass or less, the tear strength of the molded article will be improved.

Moreover, if the above reduced viscosity of the acetone-soluble fraction is 0.3 dl/g or higher, the tear strength of the molded article will be improved. If it is 0.7 dl/g or lower, the outer appearance of the molded product and the moldability of the reinforced thermoplastic resin composition will be further improved.

It should be noted that the measurement method of the acetone-soluble fraction is as follows.

2.5 g of a graft copolymer mixture is immersed in 90 ml of acetone, heated at 65° C. for 3 hours, and then centrifuged at 1,500 rpm for 30 minutes by using a centrifugal separator. Thereafter, the supernatant liquid is discarded. The residue is dried at 65° C. for 12 hours in a vacuum drier, and the resulting sample after drying is precisely weighed. From the weight difference between before and after this process (namely, [2.5 g of graft copolymer mixture]−[sample weight after drying]), the content ratio (%) of the acetone-soluble fraction relative to the graft copolymer mixture can be determined. The reduced viscosity is measured in a 0.2 g/dl N,N-dimethylformamide solution at 25° C.

The acetone-soluble fraction is a polymer which is the same as the molecular chain (B2) and is not grafted onto the rubber polymer (B1). The acetone-soluble fraction is often generated when a molecular chain (B2) is grafted onto a rubber polymer (B1). Thus, the graft copolymer (B) contains the acetone-soluble fraction and the acetone-insoluble fraction.

Production Method of Graft Copolymer (B)

The graft copolymer (B) can be obtainable by graft polymerization of an aromatic alkenyl compound monomer (a) and a vinyl cyanide compound monomer (b) and if necessary, other monomers (c) in the presence of the rubber polymer (B1).

As a graft polymerization method, emulsion polymerization method is preferred. Various chain transfer agents can be added during graft polymerization, in order to adjust the molecular weight, graft ratio of the graft copolymer (B) and reduced viscosity of the acetone-soluble fraction.

Amount of Graft Copolymer (B)

The amount of the graft copolymer (B) with respect to the total mass of the resin main component (C) (100% by mass) is 0 to 50% by mass, and preferably 5 to 20% by mass. When the amount of the graft copolymer (B) is equal or more than 5% by mass, the moldablity of the reinforced thermoplastic resin composition is further improved. When the amount of the graft copolymer is equal or less than 50% by mass, the impact resistance of the molded article is enhanced.

<Inorganic Filler (D)>

Examples of the inorganic filler (D) include inorganic fibers such as glass fibers and carbon fibers, inorganic materials such as metal-coated inorganic fibers, wollastonite, talc, mica, glass flakes, glass beads, potassium titanate, calcium carbonate, magnesium carbonate, carbon black and Ketjen Black, metals and alloys such as iron, copper, zinc and aluminum, and oxides thereof in the form of fibers and powders. Among these, carbon fibers and glass fibers are preferred since they provide high rigidity even when used in a small amounts.

One type of the inorganic filler (D) may be used alone, or two or more type may be used in combination.

The surface of the inorganic fillers, metal-coated inorganic fillers, inorganic materials, metals, alloys and fibers or powders of oxides of metals or alloys may be treated with a known coupling agent (for example, silane coupling agent and titanate coupling agent or other surface treatment agents.

In addition, the glass fibers or the carbon fibers may be bundled or coated with a thermoplastic resin such as an ethylene-vinyl acetate copolymer or a polyamide, or a thermosetting resin such as a polyurethane resin or an epoxy resin.

A carbon fiber in which the surface thereof has been treated with a polyurethane, a glass fiber in which the surface thereof has been treated with a polyurethane or a glass fiber in which the surface thereof has been treated with an epoxy resin is preferably used.

With respect to the cross-sectional shape of the glass fiber or carbon fiber, the ratio of major axis to minor axis of the cross-sectional surface of the fiber (represented by [major axis]/[minor axis]) is preferably 2 to 6, and more preferably 2 to 4. When the [major axis]/[minor axis] is equal or more than 2, excellent impact resistance and strength can be obtained. When the [major axis]/[minor axis] is equal or less than 6, excellent shape-imparting characteristic (extrusion workability) can be obtained.

The [major axis]/[minor axis] at the cross-section of the fiber can be determined by calculating the average of [major axis]/[minor axis] observed at 8 positions of the cross-section of the fiber. When the commercially available inorganic filler is used, the value of the [major axis]/[minor axis] recited in a catalogue can be applied.

As the untreated glass fiber and carbon fiber, either a long fiber or a short fiber may be used, and a short fiber having a less anisotropy is preferably used. Further, a chopped fiber is more preferably used.

One type of the inorganic filler (D) may be used alone, and two or more types may be used in combination.

Amount of Inorganic Filler (D)

The amount of the inorganic filler (D) with respect to 100% by mass of the reinforced thermoplastic resin composition is 20 to 50% by mass, and preferably 30 to 45% by mass. When the amount of the inorganic filler is equal or more than 20% by mass, rigidity of the molded article is enhanced. When the amount of the inorganic filler (D) is equal or less than 50% by mass, moldability of the reinforced thermoplastic resin composition becomes excellent.

<Glycidyl Ether Unit-Containing Polymer (E)>

A glycidyl ether unit-containing polymer (E) is a polymer containing a glycidil ether unit in the molecule thereof. In the definition of the glycidyl ether unit-containing polymer (E), a polymer containing a halogen atom (e.g., bromide) and a block-type polymer are not included. A polymer which falls under the definition of the graft copolymer (B) is not included in the definition of the glycidyl ether unit-containing polymer (E).

Examples of the glycidyl ether unit-containing polymer (E) include glycidyl ether unit-containing polymers yielded by a reaction between a compound having a hydroxy group and epichlorohydrin.

Examples of the glycidyl ether unit-containing polymers include high molecular weight substances such as bisphenol type epoxy resins, novolac type epoxy resins, polyglycidyl ethers of aliphatic polyhydric alcohols, and biphenyl type epoxy resins, which have a polymer with repeating units represented by the following formula (1) (for example, an epoxy group-containing phenoxy resin).

Chemical Formula 1

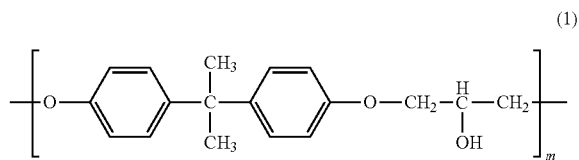

(1)

m represents an integer of 1 or more.

Examples of the bisphenol type epoxy resins include a bisphenol A type epoxy resin, a bisphenol F type epoxy resin, a bisphenol AD type epoxy resin, and an epoxy resin having structures of both bisphenol A and bisphenol F.

Examples of the novolac type epoxy resins include a phenol novolac type epoxy resin and a cresol novolac type epoxy resin.

Examples of the polyglycidyl ethers of aliphatic polyhydric alcohols include alkylene glycol diglycidyl ethers (such as ethylene glycol diglycidyl ether), polyoxyalkylene glycol diglycidyl ethers (such as diethylene glycol diglycidyl ether, polyethylene glycol diglycidyl ether, dipropylene glycol diglycidyl ether, tripropylene glycol diglycidyl ether, and polypropylene glycol diglycidyl ether), and glycerin triglycidyl ether.

As the glycidyl ether unit-containing polymers (E), in terms of high mechanical strength of the molded article, a bisphenol A type epoxy resin, a bisphenol F type epoxy resin, an epoxy resin having structures of both bisphenol A and bisphenol F, a phenol novolac type epoxy resin, a cresol novolac type epoxy resin, and an epoxy group-containing phenoxy resin are preferred. Among these, a bisphenol A type epoxy resin or an epoxy group-containing phenoxy resin is more preferred.

As the glycidyl ether unit-containing polymer (E), those in the form of a liquid, a semisolid or a solid at normal temperature (20° C.) may be used, although those in a solid state are preferred considering the workability during the mixing and kneading process.

A single type of these glycidyl ether unit-containing polymers may be used alone, or two or more types thereof may be used in combination.

[Mass Average Molecular Weight of Glycidyl Ether Unit-Containing Polymer (E)]

The mass average molecular weight of the glycidyl ether unit-containing polymer (E) is 3,800 to 60,000, and preferably 5,500 to 50,000. When the mass average molecular weight of the glycidyl ether unit-containing polymer (E) is equal or more than 3,800, impact resistance and mechanical strength are enhanced. When the mass average molecular weight of the glycidyl ether unit-containing polymer (E) is equal or less than 60,000, moldability of the reinforced thermoplastic resin composition becomes excellent.

The mass average molecular weight of the glycidyl ether unit-containing polymer (E) can be measured by mass spectrometry (for example, gel permeation chromatography in terms of polystyrene). When the commercially available glycidyl ether unit-containing polymer (E) is used, catalogue values can be employed.

How to Get Glycidyl Ether Unit-Containing Polymer (E)

As the glycidyl ether unit-containing polymer (E), for example, "jER" series manufactured by Mitsubishi Chemical Corporation, "Epototo" series and "Phenototo" series manufactured by Nippon Steel & Sumikin Chemical Co., Ltd., "AER" series manufactured by Asahi Kasei E-materials Corporation, "Epiclon" series manufactured by Dainippon Ink and Chemicals, Incorporated, and the like are commercially available.

Amount of Glycidyl Ether Unit-Containing Polymer (E)

The amount of the glycidyl ether unit-containing polymer (E) with respect to 100 parts by mass of the resin main component (C) is 1 to 10 parts by mass, and more preferably 3 to 8 parts by mass. When the amount of the glycidyl ether unit-containing polymer (E) is equal or more than 1 part by mass, mechanical strength, impact strength and weld strength of the molded article can be enhanced. When the amount of the glycidyl ether unit-containing polymer (E) is equal or less than 10 parts by mass, the moldability of the reinforced thermoplastic resin composition becomes excellent.

<Polyamide (F)>

The moisture percentage of the polyamide (F) is 0.03 to 0.1% by mass, with respect to the total amount of the polyamide. When a polyamide having moisture percentage of greater than 0.1% by mass is used, weld strength and heat resistance is deteriorated. Generally, a polyamide resin has water absorbability, moisture percentage is variable depending on storage method, storage condition, storage period and production lot. Thus, in the present invention, the moisture percentage of a polyamide is measured to determine moisture percentage before using the polyamide. The moisture percentage can be measured using an aqua track moisture meter manufactured by BRABENDER.

The polyamide is a compound having an acid amide bond (—CONH—) in the main chain thereof. As a polyamide (F), a polyamide containing at least one member selected from the group consisting of an aliphatic polyamide, an alicyclic polyamide, an aromatic polyamide, and combination thereof, and a copolymer corresponds to the combination thereof. The monomer unit constituting the polyamide may be one type, or two or more types.

As the aliphatic polyamide, alicyclic polyamide and aromatic polyamide, a ring-opening polymerization compound of a lactam, a self-polycondensation compound of an amino carboxylic acid, a polycondensation compound of a diamine and a dicarboxylic acid and a mixture thereof can be mentioned.

As a lactam, ε-caprolactam, ω-enantholactam, ω-laurolactam, α-pyrrolidone, α-piperidone, and the like can be mentioned.

As an amino acid, 6-aminocaproic acid, 7-amino heptanoic acid, 9-aminononanoic acid, 11-amino undodecanoic acid, 12-amino dodecanoic acid, and the like.

Examples of diamines include aliphatic diamines such as ethylenediamine, tetramethylene diamine, pentamethylene diamine, hexamethylene diamine, heptamethylene diamine, octamethylenediamine, nonamethylenediamine, decamethylene diamine, undecamethylene diamine, dodecamethylenediamine, tridecane diamine, tetra decane diamine, pentadecane diamine, hexadecane diamine, hepta decanediamine, octadecane diamine, nonadecane diamine, Eicosane diamine, 2-methyl-1,8-octane diamine, 2,2,4/2,4, 4-trimethyl hexamethylene diamine; and alicyclic diamines such as 1,3/1,4-cyclohexyl-diamine, bis (4-aminocyclohexyl) methane, bis (4-aminocyclohexyl) propane, bis (3-methyl-4-amino cyclohexyl) methane, (3-methyl-4-amino cyclohexyl) propane, 1,3/1,4-bis amino methyl cyclohexane, 5-amino-2,2,4-trimethyl-1-cyclopentane methyl amine, 5-amino-1,3,3-trimethyl cyclohexane methylamine bis (aminopropyl) piperazine, bis (aminoethyl) piperazine, norbornane dimethyleneamine; and aromatic diamines such as p-xylylenediamine and m-xylylenediamine.

Examples of dicarboxylic acid include aliphatic dicarboxylic acid such as adipic acid, pimelic acid, suberic acid, azelaic acid, sebacic acid, undecanedioic acid, dodecanedioic acid, tridecanedioic acid, tetradecanedioic acid, pentadecanedioic acid, hexadecanedioic acid, octadecanedioic acid, and eicosanedioic acid; acyclic dicarboxylic acid such as 1,3/1,4-cyclohexane dicarboxylic acid, di-cyclohexane-4,4'-dicarboxylic acid, and norbornanedicarboxylic carboxylic acid; and an aromatic dicarboxylic acid such as isophthalic acid, terephthalic acid, and 1,4/1,8/2,6/2,7-naphthalene dicarboxylic acid.

In the viewpoint of economic efficiency and versatility, as a polyamide (F), an aliphatic polyamide and an aromatic polyamide are preferred, and in terms of workability and balance of physical properties of the molded article to be obtained, an aliphatic polyamide is particularly preferred.

One type of the polyamide (F) may be used alone, or two or more types may be used in combination. A copolymer polyamide in which two or more polyamide are combined.

Examples of aliphatic polyamides include polymers such as polycaproamide (nylon 6), poly aminoundecanoic acid (nylon 11), polylauryllactam (nylon 12), poly hexamethylene amino adipic acid (nylon 66), poly hexamethylene amino sebacic acid (nylon 610), polyhexamethylene diaminodiphenyl dodecanedioic acid (nylon 612); copolymers such as caprolactam/lauryl lactam copolymer (nylon 6/12), caprolactam/aminoundecanoic acid copolymer (nylon 6/11), caprolactam/hexamethylene amino adipic acid copolymer (nylon 6/66), caprolactam/hexamethylene diaminodiphenyl adipic acid/amino dodecanedioic acid (nylon 6/66/12), caprolactam/hexamethylene amino adipic acid/lauryl lactam (nylon 6/66/12), caprolactam/hexamethylene amino adipic acid/hexamethylene amino sebacic acid (nylon 6/66/610), and caprolactam/hexamethylene amino adipic acid/hexamethylene diaminododecane diacid (nylon 6/66/612). As the aliphatic polyamide, one type may be used alone, or two or more types used in combination.

Among the aliphatic polyamide, at last one aliphatic polyamide selected from the group consisting of nylon6, nylon66, nylon610, nylon11, nylon12, nylon612, nylon6/66, nylon6/11, nylon6/12, and nylon6/66/12 is preferable, and in terms of melting point or cost, nylon6 and nylon 66 are particularly preferred, and nylon6 is most preferable.

An aromatic polyamide is an aromatic polyamide resin containing at least one aromatic monomer component. The aromatic monomer component is a structural unit derived from an aromatic monomer. As the aromatic polyamide, in order to enhance melt viscosity and to suppress crystallization speed, a polyamide obtainable by polycondensation of an aliphatic dicarboxylic acid and an aromatic diamine, or an aromatic dicarboxylic acid and an aliphatic diamine as raw materials can be mentioned.

[Relative Viscosity of Polyamide (F)]

The relative viscosity of the polyamide (F) is preferably 1.5 to 4.5, and more preferably 2.0 to 4.0, and still more preferably 2.5 to 3.5. When the relative viscosity of the polyamide (F) is equal or more than 1.5, weld strength of the molded article can be enhanced. When the relative viscosity of the polyamide is equal or less than 4.5, moldability becomes excellent.

The relative viscosity of the polyamide (F) can be measured by using 96% by mass of sulfuric acid solution (content: 1.0 g/dl), and using an Ostwald type viscometer at 25° C. When the commercially available polyamide (F) is used, the value of the relative viscosity recited in a catalogue can be applied.

Amount of Polyamide (F)

The amount of polyamide (F) with respect to the 100 parts by mass of the resin main component (C) is 1 to 15 parts by mass, and more preferably 3 to 10 parts by mass. When the amount of the polyamide is equal or more than 1 parts by mass, the weld strength of the molded article can be enhanced. When the amount of the polyamide (F) is equal or less than 15 parts by mass, deterioration of weld strength and warpage of a molded article can be suppressed.

<Flame Retardant>

In the reinforced thermoplastic resin composition of the present invention, a flame retardant may be blended.

As a flame retardant, a phosphoric acid ester-type flame retardant (G), and a known non-halogenated-type flame retardant can be mentioned.

Phosphoric Acid Ester-Type Flame Retardant (G)

As a phosphoric acid ester-type flame retardant (G), a compound represented by formula (2) shown below can be mentioned.

Chemical Formula 2

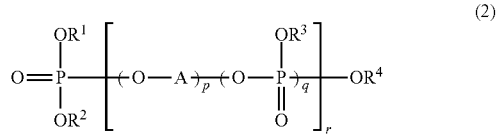

(2)

In the formula, $R^1$, $R^2$, $R^3$ and $R^4$ each independently represents a hydrogen atom or an organic group, provided that, all of $R^1$, $R^2$, $R^3$ and $R^4$ do not represent hydrogen atoms (at least one represents an organic group); A represents a divalent or higher organic group; p represents 0 or 1; q represents an integer of 1 or more; and r represents an integer of 0 or more.

Examples of the organic group include an alkyl group which may be substituted (such as a methyl group, an ethyl group, a butyl group and an octyl group), a cycloalkyl group (such as a cyclohexyl group), and an aryl group (such as a phenyl group and an alkyl group-substituted phenyl group). In addition, the number of substituents, if any, is not limited. Examples of the substituted organic group include an alkoxy group, an alkylthio group, an aryloxy group and an arylthio group. In addition, the organic group may be a group in which these substituents are combined (such as an arylalkoxyalkyl group) or a group in which these substituents are combined by bonding through an oxygen atom, a nitrogen atom, a sulfur atom or the like (such as an arylsulfonyl aryl group).

Further, the term "divalent or higher organic group" refers to a divalent or higher functional group obtained by removing two or more hydrogen atoms bonded to carbon atom(s)

in the above-mentioned organic group. Examples thereof include an alkylene group and a (substituted) phenylene group. Hydrogen atoms at any position may be removed from the carbon atom(s).

Specific examples of the phosphoric acid ester-type flame retardant (G) include trimethyl phosphate, triethyl phosphate, tributyl phosphate, trioctyl phosphate, tributoxyethyl phosphate, triphenyl phosphate, tricresyl phosphate, tricyclohexyl phosphate, cresyl diphenyl phosphate, hexyl diphenyl phosphate, octyl diphenyl phosphate, diphenyl-2-ethylcresyl phosphate, tris (isopropyl phenyl) phosphate, resorcinol sulfonyl diphenyl phosphate, polyphosphate (e.g., bisphenol A bisphosphate, hydroquinone bisphosphate, resorcinol bisphosphate, trioxybenzene phosphate, bisphenol A bis (di-cresyl phosphate), bisphenol A bis (diphenyl phosphate), phenylenebis (diphenyl phosphate), phenylenebis (di-tolyl phosphate), phenylenebis (dixylyl phosphate)).

Among these phosphoric acid ester-type flame retardants (G), triphenyl phosphate, bisphenol A his (diphenyl phosphate), phenylene his (diphenyl phosphate), and phenylene bis (dixylyl phosphate) is preferred.

Polyphosphates can be obtained by, for example, dehydration and condensation between various diol forms such as polynuclear phenols (for example, bisphenol A) and an orthophosphoric acid. Examples of the diol forms include hydroquinone, resorcinol, diphenylolmethane, diphenyloldimethylmethane, dihydroxybiphenyl, p,p'-dihydroxy diphenyl sulfone and dihydroxynaphthalene.

(Mass Average Molecular Weight of Phosphoric Acid Ester-Type Flame Retardant (G))

The mass average molecular weight of the phosphoric acid ester-based flame retardant (G) is preferably equal or more than 326, more preferably greater than 326, and particularly preferably equal or more than 550. In particular, when the phosphoric acid ester-based flame retardant (G) having the mass average molecular weight of greater than 326 is used, moldability of the reinforced thermoplastic resin composition becomes excellent, and a molded article having excellent appearance can be obtained. The upper limit of the mass average molecular weight of the phosphoric acid ester-based flame retardant (G) is preferably equal or less than 692, and more preferably equal or less than 690, and particularly preferably equal or less than 686, from the viewpoint of flame retardancy of the molded article. More specifically, 326 to 692 is preferable, 550 to 690 is more preferable, and 550 to 686 is still more preferable.

The mass average molecular weight of phosphoric acid ester-type flame retardant (G) can be measured by mass spectrometry (for example, gel permeation chromatography in terms of polystyrene). When the commercially available phosphoric acid ester-type flame retardant (G) is used, catalogue values can be employed.

(How to Get Phosphoric Acid Ester-Type Flame Retardant (G))

As commercialized products of the phosphoric acid ester-type flame retardant (G), FP series manufactured by ADEKA Corporation, Kronitex (Registered trademark) series manufactured by Ajinomoto Fine-Techno Co., Inc., Reofos (Registered trademark) series manufactured by Chemtura Japan Ltd., CR series and PX series of Daihachi Chemical Co. can be mentioned.

(Amount of Phosphoric Acid Ester-Type Flame Retardant (G))

The amount of the phosphoric acid ester-type flame retardant (G) with respect to 100 parts by mass of the resin main component (C) is preferably 1 to 25 parts by mass, and more preferably 3 to 23 parts by mass. When the amount of the phosphoric acid ester-type flame retardant (G) is equal or more than 1 parts by mass, moldability of molded article becomes excellent. When the amount of the phosphoric acid ester-type flame retardant (G) is equal or less than 25 parts by mass, impact resistance of the molded article can be enhanced.

Non-Halogenated Flame Retardant

As a non-halogenated flame retardants, inorganic-type flame retardants such as phosphazene, phosphorus-containing polyester, red phosphorus, aluminum hydroxide.

As a red phosphorus-type flame retardant, a compound coated by a thermosetting resin to be stabilized, and a compound coated by a thermosetting resin and a metal hydroxide to be stabilized can be used. Since the red phosphorus-type flame retardant is a flammable by itself, the red phosphorus-type flame retardant may be mixed with at least part of the resin main component (C) or a polycarbonate resin (A) in advance to form a masterbatch.

<Flame Retardant Auxiliary Agent (H)>

In the reinforced thermoplastic resin composition of the present invention, a flame retardant auxiliary agent (H) capable of inhibiting drip during combustion can be blended. For example, a compound having a polytetrafluoroethylene unit or a tetrafluoroethylene unit and a silicone-type polymer can be mentioned.

When a compound having a polytetrafluoroethylene unit or a tetrafluoroethylene unit is blended as a frame retardant auxiliary agent (H), the amount of the flame retardant auxiliary agent (H) with respect to 100 parts by mass of the resin main component (C) is preferably equal or less than 1 parts by mass in terms of surface appearance of the molded article.

<Other Component>

If necessary, in the reinforced thermoplastic resin composition of the present invention, other modifiers, release agents, stabilizers against light or heat, antistatic agents, dyes, pigments and the like may be blended.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); and a polyamide (F) that has a moisture percentage of 0.1% by mass or less, wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C); and the polyamide (F) is nylon 6 or nylon 66.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); and a polyamide (F) that has a moisture percentage of 0.1% by mass or less, wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66; and the viscosity-average molecular weight of the polycarbonate resin (A) is 15,000 to 35,000.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); and a polyamide (F) that has a moisture percentage of 0.1% by mass or less, wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66;

the viscosity-average molecular weight of the polycarbonate resin (A) is 15,000 to 35,000; and the inorganic filler (D) is a carbon fiber in which the surface thereof has been treated with a polyurethane, a glass fiber in which the surface thereof has been treated with a polyurethane or a glass fiber in which the surface thereof has been treated with an epoxy resin.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); and a polyamide (F) that has a moisture percentage of 0.1% by mass or less, wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66;

the viscosity-average molecular weight of the polycarbonate resin (A) is 15,000 to 35,000;

the inorganic filler (D) is a carbon fiber in which the surface thereof has been treated with a polyurethane, a glass fiber in which the surface thereof has been treated with a polyurethane or a glass fiber in which the surface thereof has been treated with an epoxy resin; and the glycidyl ether unit-containing polymer (E) is a bisphenol A type epoxy resin or an epoxy group-containing phenoxy resin.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); and a polyamide (F) that has a moisture percentage of 0.1% by mass or less, wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66;

the viscosity-average molecular weight of the polycarbonate resin (A) is 15,000 to 35,000;

the inorganic filler (D) is a carbon fiber in which the surface thereof has been treated with a polyurethane, a glass fiber in which the surface thereof has been treated with a polyurethane or a glass fiber in which the surface thereof has been treated with an epoxy resin;

the glycidyl ether unit-containing polymer (E) is a bisphenol A type epoxy resin or an epoxy group-containing phenoxy resin; and the rubber polymer (B1) is a butadiene rubber, a styrene-butadiene rubber, an acrylonitrile-butadiene rubber, an acrylic rubber, a diene-acrylic composite rubber or a silicone-acrylic composite rubber.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); a polyamide (F) that has a moisture percentage of 0.1% by mass or less; and a phosphoric acid ester-type flame retardant (G), wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66;

the viscosity-average molecular weight of the polycarbonate resin (A) is 15,000 to 35,000;

the inorganic filler (D) is a carbon fiber in which the surface thereof has been treated with a polyurethane, a glass fiber in which the surface thereof has been treated with a polyurethane or a glass fiber in which the surface thereof has been treated with an epoxy resin;

the glycidyl ether unit-containing polymer (E) is a bisphenol A type epoxy resin or an epoxy group-containing phenoxy resin;

the rubber polymer (B1) is a butadiene rubber, a styrene-butadiene rubber, an acrylonitrile-butadiene rubber, an acrylic rubber, a diene-acrylic composite rubber or a silicone-acrylic composite rubber; and the phosphoric acid ester-type flame retardant (G) is a bisphenol A bis (diphenyl phosphate), or phenylene bis (dixylyl phosphate) or tripnehylphosphate.

The reinforced thermoplastic resin composition is preferably a thermoplastic resin composition containing: a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1) (provided that, the total amount of the polycarbonate resin (A) and the graft copolymer (B) is 100% by mass); an inorganic filler (D); a glycidyl ether unit-containing polymer (E) that has a glycidyl ether unit and has the mass average molecular weight of 3,800 to 60,000 (provided that the graft copolymer (B) is excluded from the definition of the glycidyl ether unit-containing polymer (E)); a polyamide (F) that has a moisture percentage of 0.1% by mass or less; a phosphoric acid ester-type flame retardant (G); and a frame retardant auxiliary agent (H), wherein the amount of the inorganic filler (D) is 20 to 50% by mass, with respect to 100% by mass of the reinforced thermoplastic resin composition;

the amount of the glycidyl ether unit-containing polymer (E) is 1 to 10 parts by mass, with respect to 100 parts by mass of the resin main component (C);

the amount of polyamide (F) is 1 to 15 parts by mass, with respect to 100 parts by mass of the resin main component (C);

the polyamide (F) is nylon 6 or nylon 66;

the viscosity-average molecular weight of the polycarbonate resin (A) is 15,000 to 35,000;

the inorganic filler (D) is a carbon fiber in which the surface thereof has been treated with a polyurethane, a glass fiber in which the surface thereof has been treated with a polyurethane or a glass fiber in which the surface thereof has been treated with an epoxy resin;

the glycidyl ether unit-containing polymer (E) is a bisphenol A type epoxy resin or an epoxy group-containing phenoxy resin;

the rubber polymer (B1) is a butadiene rubber, a styrene-butadiene rubber, an acrylonitrile-butadiene rubber, an acrylic rubber, a diene-acrylic composite rubber or a silicone-acrylic composite rubber;

the phosphoric acid ester-type flame retardant (G) is a bisphenol A his (diphenyl phosphate), or phenylene his (dixylyl phosphate) or tripnehylphosphate, and the frame retardant auxiliary agent (H) is a polytetrafluoroethylene.

<Production Method of Reinforced Thermoplastic Resin Composition>

The reinforced thermoplastic resin composition of the present invention can be obtained by mixing the polycarbonate resin (A), if necessary a graft copolymer (B), an inorganic filler (D), glycidyl ether unit-containing polymer (E), a polyamide (F), and, if necessary, other components such as a frame retardant, a frame retardant auxiliary agent (H), using a mixing device (for example, a Henschel mixer, tumbler mixer, Nauta mixer or the like). The mixture may also be further kneaded using a kneading device (for example, a single screw extruder, a twin screw extruder, a Banbury mixer, a co-kneader, or the like).

<Function Effect>

The reinforced thermoplastic resin composition of the present invention described above includes a polycarbonate resin (A), if necessary, graft copolymer (B), an inorganic filler (D), a glycidyl ether unit-containing polymer (E), and a polyamide (F) in a specific amount, thus, moldablity is excellent, and weld strength, rigidity, impact strength, mechanical strength and heat resistance of the molded article can be enhanced.

Molded Article

The molded article of the second aspect of the present invention is formed through molding and processing of the reinforced thermoplastic resin composition of the first aspect of the present invention.

Examples of the molding and processing method of the reinforced thermoplastic resin composition include an injection molding method (such as an insert molding using a film or a glass plate), an injection compression molding method, an extrusion molding method, a blow molding method, a vacuum molding method, an air-pressure molding method, a calendar molding method and an inflation molding method. Among these, an injection molding method and an injection compression molding method are preferred, since they are superior in terms of mass production and are capable of yielding molded articles of highly precise dimensions.

The molded article of the present invention can be applied to, for example: housings of a personal computer (including a notebook-type and tablet-type), a projector (including a liquid crystal projector), a television set, a printer, a fax machine, a copying machine, audio equipment, a game machine, a camera (including a video camera, a digital camera, and the like), filming equipment such as video equipment, musical instruments, a portable device (such as an electronic diary and a personal digital assistant (PDA)), lighting equipment, and a communication device such as a telephone (including a phone such as a mobile phone and a smartphone); fishing goods; play equipment (such as pinball goods); products for vehicles; products for furniture; products for sanitation; and products for building materials. Among these applications, suitable application is a housing of mobile devices (such as a notebook-type or tablet-type personal computer, a portable device such as smartphone, or the like) because the effects of the present invention can be especially exploited.

EXAMPLES

Hereunder, specific examples are shown. The present invention is in no way limited by these examples. In addition, in the following description, the units "parts" and "%" refer to "parts by mass" and "% by mass", respectively.

<Measurement Method and Evaluation Method>

Acetone-Soluble Fraction 2.5 g of a graft copolymer was immersed in 90 ml of acetone, heated at 65° C. for 3 hours, and then centrifuged at 1,500 rpm for 30 minutes by using a centrifugal separator. Thereafter, the supernatant liquid was discarded. The residue was dried at 65° C. for 12 hours in a vacuum drier, and the resulting sample after drying was precisely weighed. From the weight difference between before and after this process (namely, [2.5 g of graft copolymer]−[sample weight after drying]), the content ratio (%) of the acetone-soluble fraction relative to the graft copolymer was determined.

The reduced viscosity was measured in a 0.2 g/dl N,N-dimethylformamide solution at 25° C.

Charpy Impact Strength

The Charpy impact strength was measured in accordance with ISO 179.

Flexural Strength and Flexural Modulus

The flexural strength and the flexural modulus were measured in accordance with ISO 178. The flexural strength is an indicator of mechanical strength, and the flexural modulus is an indicator of rigidity of the molded article.

Weld Strength

A liquid crystal display cover (having a thickness of 1 mm) for an A4 sized laptop personal computer was molded by the injection molding machine (J350E with a 350 t accumulator, manufactured by The Japan Steel Works, LTD.) in the condition in which the molding temperature was 290° C., the injection rate was 99%, and the mold temperature was 80° C. After pressing a weld in the molded article by a one-point terminal, test force (N) at the time of cracking was measured, and the evaluation result was regarded as weld strength.

Heat Resistance

The deflection temperature was measured in accordance with ISO 75 by 1.80 MPa load flat-wise method.

Moldability

A liquid crystal display cover (having a thickness of 1 mm) for an A4 sized laptop personal computer was molded in the same manner as in evaluation of weld strength. The moldability was evaluated based on the occurrence of short shot (unfilled portions) and the occurrence of corrosion by gas during the molding.

A: No unfilled portion was observed.
B: Unfilled portions were partially observed.
C: Either one or both of unfilled portions and corrosion by gas was observed.

Warpage

A liquid crystal display cover (having a thickness of 1 mm) for an A4 sized laptop personal computer was molded in the same manner as in evaluation of weld strength. The resulting molded article (liquid crystal display cover) was immersed in water for 2 days, and then the degree of warpage was evaluated to compare the molded article before immersion.

○: The degree of warpage was less than 1 mm.
x: The degree of warpage was equal or more than 1 mm.

<Each Components>

[Polycarbonate Resin (A)]

The "Novarex 7021PJ" manufactured by Mitsubishi Engineering-Plastics Corporation was used as the polycarbonate resin (A-1) (viscosity average molecular weight: 18,800).

Production of Graft Copolymer (B-1)

2 parts (in terms of solid content) of a copolymer latex having an average particle size of 0.08 μm consisting of 85% of an n-butyl acrylate unit and 15% of a methacrylic acid unit were added, with stirring, to 100 parts (in terms of solid content) of a polybutadiene latex having an average particle size of 0.08 μm at a solid content concentration of 35%. Subsequently, the mixture was kept stirred for 30 minutes, thereby yielding an enlarged butadiene-based rubber polymer (B1-1) latex having an average particle size of 0.28 μm.

The yielded enlarged butadiene-based rubber polymer (B1-1) latex was placed in a reaction vessel, to which 100 parts of distilled water, 4 parts of a wood rosin emulsifier, 0.4 parts of Demol N (product name of naphthalene sulfonate formaldehyde condensate manufactured by Kao Corporation), 0.04 parts of sodium hydroxide, and 0.7 parts of dextrose were further added. Subsequently, the mixture was heated under stirring. When the internal temperature reached 60° C., 0.1 part of ferrous sulfate, 0.4 parts of sodium pyrophosphate, and 0.06 parts of sodium dithionite were added. Then, a mixture containing the following components was continuously added dropwise over 90 minutes. The resultant product was allowed to stand for 1 hour and then was cooled down.

| Acrylonitrile | 30 parts |
| Styrene | 70 parts |
| Cumene hydroperoxide | 0.4 parts |
| tert-dodecylmercaptan | 1 part |

The thus yielded graft copolymer (B-1) latex was coagulated with dilute sulfuric acid. The coagulated product was then washed, filtered, and dried, thereby yielding a graft copolymer (B-1) in the form of a dried powder.

The acetone-soluble fraction of this graft copolymer (B-1) was 27%. In addition, the reduced viscosity of this acetone-soluble fraction was 0.3 dl/g.

Production of Graft Copolymer Mixture (B-2)

Raw materials at the following proportions were charged in a reaction vessel and polymerized under stirring with nitrogen substitution at 50° C. for 4 hours, thereby yielding a rubber latex.

| n-butyl acrylate | 98 parts |
| 1,3-butylene glycol dimethacrylate | 1 part |
| Allyl methacrylate | 1 part |

-continued

| | |
|---|---|
| Sodium dioctylsulfosuccinate | 2.0 parts |
| Deionized water | 300 parts |
| Potassium persulfate | 0.3 parts |
| Disodium phosphate dodecahydrate | 0.5 parts |
| Sodium hydrogen phosphate dodecahydrate | 0.3 parts |

100 parts (in terms of solid content) of the thus yielded rubber polymer (B1-2) latex was charged in a separate reaction vessel and diluted by adding 280 parts of ion exchanged water thereto, and the resulting diluted product was heated to 70° C.

Separately, 0.7 parts of benzoyl peroxide was dissolved in 100 parts of a monomer mixture composed of acrylonitrile/styrene=29/71 (weight ratio), and the mixture was subjected to nitrogen substitution. Then, this monomer mixture was added at a rate of 30 parts/hour by a metering pump into the reaction vessel which contained the above-mentioned rubber polymer (B1-2) latex. After all the monomers were added, the temperature inside the reaction vessel was raised to 80° C., and the mixture was kept stirred for 30 minutes, thereby yielding a graft copolymer (B-2) latex. The polymerization rate was 99%.

The above graft copolymer (B-2) latex was charged into a coagulation bath which contained an aqueous solution of 0.15% aluminum chloride ($AlCl_3 \cdot 6H_2O$) (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was removed therefrom by a centrifugal separator. The resulting product was washed and then dried, thereby yielding a graft copolymer (B-2) in the form of a dried powder.

The acetone-soluble fraction of this graft copolymer (B-2) was 21%. In addition, the reduced viscosity of this acetone-soluble fraction was 0.70 dl/g.

Production of Graft Copolymer Mixture (B-3)

A graft copolymer (B-3) including a composite rubber of polybutadiene/polybutyl acrylate as a rubber polymer (B1-3) was obtained by the method described below.

0.4 parts (in terms of solid content) of a copolymer latex having an average particle size of 0.10 μm composed of 82% of an n-butyl acrylate unit and 18% of a methacrylic acid unit were added, with stirring, to 20 parts (in terms of solid content) of a polybutadiene latex having an average particle size of 0.08 μm at a solid content concentration of 35%. Subsequently, the mixture was kept stirred for 30 minutes, thereby yielding an enlarged diene-based rubber latex having an average particle size of 0.36 μm.

20 parts (in terms of solid content) of the thus yielded enlarged diene-based rubber latex were placed in a reaction vessel, to which 1 part of disproportionated potassium rosinate, 150 parts of ion exchanged water, and a monomer mixture having the following composition were added. The resulting product was subjected to nitrogen substitution and then heated to 50° C. (internal temperature).

| | |
|---|---|
| n-butyl acrylate | 80 parts |
| Allyl methacrylate | 0.32 parts |
| Ethylene glycol dimethacrylate | 0.16 parts |

Furthermore, a solution having 0.0002 parts of ferrous sulfate, 0.0006 parts of disodium ethylenediaminetetraacetate, and 0.25 parts of Rongalite dissolved in 10 parts of ion exchanged water was added into the reaction vessel, to effect a reaction. The internal temperature at the completion of the reaction was 75° C. The solution was further heated up to 80° C., and the reaction was kept continued for 1 hour, thereby yielding a rubber polymer (B1-3) latex composed of a composite rubber of the enlarged diene-based rubber and the polybutyl acrylate-based rubber. The polymerization rate was 98.8%.

Subsequently, 50 parts (in terms of solid content) of the rubber polymer (B1-3) latex of the enlarged diene-based rubber and the polybutyl acrylate-based rubber were placed in a reaction vessel, which was then diluted by adding 140 parts of ion exchanged water thereto. The resulting diluted solution was heated to 70° C. Separately, 0.35 parts of benzoyl peroxide were dissolved in 50 parts of a monomer mixture composed of acrylonitrile/styrene=29/71 (weight ratio), and the mixture was subjected to nitrogen substitution. This monomer mixture was added at a rate of 15 parts/hour by a metering pump into the reaction vessel which contained the above-mentioned rubber polymer (B1-3) latex. After all the monomers were added, the temperature inside the reaction vessel was raised to 80° C., and the mixture was kept stirred for 30 minutes, thereby yielding a graft copolymer (B-3) latex. The polymerization rate was 99%.

The above graft copolymer (B-3) latex was charged into a coagulation bath which contained a 0.5% aqueous solution of sulfuric acid (90° C.) at a three times greater amount than the total amount of the latex, under stirring to effect coagulation. After all the latex was added, the temperature inside the coagulation bath was raised to 93° C., and the mixture was allowed to stand for 5 minutes. This was cooled down, and then liquid was removed therefrom by a centrifugal separator. The resulting product was washed and then dried, thereby yielding a graft copolymer (B-3) in the form of a dried powder.

The acetone-soluble fraction of this graft copolymer (B-3) was 20%. In addition, the reduced viscosity of this acetone-soluble fraction was 0.7 dl/g.

Production of Graft Copolymer Mixture (B-4)

A graft copolymer (B-4) including a composite rubber of polysiloxane rubber/polybutyl acrylate as a rubber polymer was obtained by the method described below.

96 parts of octamethyltetracyclosiloxane, 2 parts of γ-methacryloxypropyldimethoxymethylsilane, and 2 parts of ethyl orthosilicate were mixed to yield 100 parts of a siloxane-based mixture. 300 parts of distilled water having 0.67 parts of sodium dodecylbenzene sulfonate dissolved therein were added to this mixture. The resulting mixture was stirred by a homomixer at 10000 revolutions/2 minutes, and was then homogenized once at a pressure of 30 MPa by a homogenizer, thereby yielding a stable premixed organosiloxane latex.

In addition, 2 parts of dodecylbenzenesulfonate and 98 parts of distilled water were charged in a reaction vessel equipped with a reagent injection container, a cooling tube, a jacket heater and a stirring device, by which an aqueous solution of 2% dodecylbenzenesulfonate was prepared. While heating this aqueous solution to 85° C., the premixed organosiloxane latex was dropwise added thereto over 4 hours. After the completion of the dropwise addition, the solution was kept at this temperature for 1 hour, and was then cooled down.

The reaction solution was allowed to stand at room temperature for 48 hours and was then neutralized with an aqueous solution of sodium hydroxide, thereby yielding a polyorganosiloxane latex (L-1). A portion of the polyorganosiloxane latex (L-1) was dried at 170° C. for 30 minutes to obtain the solid content concentration. The thus the obtained solid content concentration was 17.3%.

119.5 parts of the polyorganosiloxane latex (L-1) and 0.8 parts of sodium polyoxyethylene alkyl phenyl ether sulfate were charged in a reaction vessel equipped with a reagent injection container, a cooling tube, a jacket heater, and a stirring device. Subsequently, 203 parts of distilled water was added and mixed therein. Then, a mixture composed of 53.2 parts of n-butyl acrylate, 0.21 parts of allyl methacrylate, 0.11 parts of 1,3-butylene glycol dimethacrylate, and 0.13 parts of tertiary butyl hydroperoxide was added thereto. A nitrogen gas was let to flow through this reaction vessel so as to substitute the inside atmosphere with nitrogen, and the temperature was raised to 60° C. When the internal temperature of the reaction vessel reached 60° C., an aqueous solution having 0.0001 parts of ferrous sulfate, 0.0003 parts of disodium ethylenediaminetetraacetate, and 0.24 parts of Rongalite dissolved in 10 parts of distilled water was added to initiate radical polymerization. Due to the polymerization of the acrylate components, the temperature of the solution increased to 78° C. This state was maintained for 1 hour to complete the polymerization of the acrylate components, thereby yielding a rubber polymer (B1-4) latex composed of a composite rubber latex of polyorganosiloxane and a butyl acrylate rubber.

After the solution temperature inside the reaction vessel decreased to 60° C., an aqueous solution having 0.4 parts of Rongalite dissolved in 10 parts of distilled water was added. Subsequently, a mixed solution including 11.1 parts of acrylonitrile, 33.2 parts of styrene, and 0.2 parts of tertiary butyl hydroperoxide was dropwise added thereto over about 1 hour to effect polymerization. After the completion of the dropwise addition, the resulting mixture was allowed to stand for 1 hour, and an aqueous solution having 0.0002 parts of ferrous sulfate, 0.0006 parts of disodium ethylenediaminetetraacetate, and 0.25 parts of Rongalite dissolved in 10 parts of distilled water was then added thereto. Subsequently, a mixed solution including 7.4 parts of acrylonitrile, 22.2 parts of styrene, and 0.1 parts of tertiary butyl hydroperoxide was dropwise added thereto over about 40 minutes to effect polymerization. After the completion of the dropwise addition, the resulting mixture was allowed to stand for 1 hour, and was then cooled down, thereby yielding a graft copolymer (B-4) latex in which an acrylonitrile-styrene copolymer was grafted onto the composite rubber composed of polyorganosiloxane and the butyl acrylate rubber.

Subsequently, 150 parts of a 5% aqueous solution of calcium acetate was heated to 60° C. and stirred. 100 parts of the graft copolymer mixture latex was gradually dropwise added into this aqueous solution of calcium acetate to effect coagulation. The resulting coagulated product was separated, washed, and then dried, thereby yielding a graft copolymer (B-4) in the form of a dried powder.

The acetone-soluble fraction of this graft copolymer (B-4) was 26%. In addition, the reduced viscosity of this acetone-soluble fraction was 0.60 dl/g.

Inorganic Filler (D)

The chopped fibers made of carbon fibers (manufactured by Mitsubishi Rayon Co., "TRO6U", surface treatment agent:polyurethane) was used as an inorganic filler (D-1).

The chopped fibers made of glass fibers (manufactured by Nitto Boseki Co., Ltd., "CSG 3PA-820", surface treatment agent:polyurethane, the ratio [major axis]/[minor axis]:4) was used as an inorganic filler (D-2).

The chopped fibers made of glass fibers (manufactured by Nitto Boseki Co., Ltd., "CSH 3PA-870", surface treatment agent:polyurethane, the ratio [major axis]/[minor axis]:2) was used as an inorganic filler (D-3).

The chopped fibers made of glass fibers (manufactured by Nitto Boseki Co., Ltd., "CSH 3PA-850", surface treatment agent:epoxy resin, the ratio [major axis]/[minor axis]:2) was used as an inorganic filler (D-4).

The chopped fibers made of glass fibers (manufactured by Nitto Boseki Co., Ltd., "CS3PA-455", surface treatment agent:polyurethane, the ratio [major axis]/[minor axis]:1) was used as an inorganic filler (D-5).

Glycidyl Ether Unit-Containing Polymer (E)

The epoxy group-containing phenoxy resin (manufactured by Mitsubishi Chemical Corporation, "jER4250", the mass average molecular weight: 60,000) was used as a glycidyl ether unit-containing polymer (E-1).

The epoxy group-containing phenoxy resin (manufactured by Mitsubishi Chemical Corporation, "jER1256", the mass average molecular weight: 50,000) was used as a glycidyl ether unit-containing polymer (E-2).

The epoxy group-containing phenoxy resin (manufactured by Mitsubishi Chemical Corporation, "jER1010", the mass average molecular weight: 5,500) was used as a glycidyl ether unit-containing polymer (E-3).

The epoxy group-containing phenoxy resin (manufactured by Mitsubishi Chemical Corporation, "jER1009", the mass average molecular weight: 3,800) was used as a glycidyl ether unit-containing polymer (E-4).

The epoxy group-containing phenoxy resin (manufactured by Mitsubishi Chemical Corporation, "jER1004", the mass average molecular weight: 1,650) was used as a glycidyl ether unit-containing polymer (E-5).

Production of Glycidyl Ether Unit-Containing Polymer (E-6)

82.42 parts of bisphenol A type epoxy resin (epoxy equivalent: 467 g/eq), 6.3 parts of liquid bisphenol A type epoxy resin (epoxy equivalent: 210 g/eq, hydrolyzable chlorine: 1.79%), 13.95 parts of bisphenol A, 19.6 parts of p-cumyl phenol, 7.5 parts of polyester resin (manufactured by Japan U-Pica Company. Ltd., trade name: GV-335, acid value: 30 KOHmg/g), and 30 parts of xylene were added to a 500 ml capacity separable flask equipped with a stirrer, thermometer, nitrogen inlet, and cooling tube. Then, the mixture was heated under nitrogen atmosphere.

When an inner temperature of the flask had reached 80° C., 0.18 parts of 5% aqueous solution of lithium chloride was added thereto, and the mixture was further heated. When the inner temperature of the flask had reached 130° C., the inside of the flask was left under reduced pressure to remove water and xylene from the flask. The reaction was conducted while maintaining the reaction temperature at 160° C. After 1 hour, nitrogen gas was induced into the flask and internal pressure of the flask was left under ordinary pressure. Seven hours after the time when the reaction temperature had reached 160° C., 20.25 parts of bisphenol A type epoxy resin having high molecular weight (epoxy equivalent: 2700 g/eq) was added. After stirring for 1 hour, 100 parts of polyester resin (manufactured by Japan U-Pica Company. Ltd., trade name: GV-730, acid value: 3 KOHmg/g) was added, and reacted for 10 hours at 180° C., then glycidyl ether unit-containing polymer (E-6) was obtained. 0.1 g of the resulting glycidyl ether unit-containing polymer (E-6) was tried to dissolve in 10 mL of tetrahydrofuran in order to prepare a sample for molecular weight measurement by GPC. However, 0.05 g in 0.1 g of glycidyl ether unit-containing polymer (E-6) was insoluble in tetrahydrofuran. After filtration with a filter paper 5C, the filtrate was provided to molecular weight measurement by GPC, and the mass average molecular weight was 70,200.

Polyamide (F)

Polyamide 6 (manufactured by Ube Industries, Ltd., "1022B", relative viscosity: 3.4, moisture percentage: 0.1%) was used as a polyamide (F-1).

Polyamide 6 (manufactured by Ube Industries, Ltd., "1013B", relative viscosity: 2.6, moisture percentage: 0.1%) was used as a polyamide (F-2).

Polyamide 66 (manufactured by Asahi Chemical Industry Co., Ltd., "1500", relative viscosity: 3.7, moisture percentage: 0.1%) was used as a polyamide (F-1).

Polyamide 6 (manufactured by Ube Industries, Ltd., "1022B", relative viscosity: 3.4, moisture percentage: 0.2%) was used as a polyamide (F-1).

Here, the polyamide (F-1) was used immediately after the product bag was opened, and the polyamide (F-4) was left one week after opening the product bag.

Phosphoric Acid Ester-Based Flame Retardant (G)

Bisphenol A-bis(diphenyl phosphate) (manufactured by Ajinomoto Fine-Techno Co., Inc., "BAPP", mass average molecular weight: 692, catalogue value) was used as a phosphoric acid ester-based flame retardant (G-1).

Phenylenebis(dixylyl phosphate) (manufactured by Daihachi Chemical Industry Co., Ltd., "PX-200", mass average molecular weight: 686, catalogue value) was used as a phosphoric acid ester-based flame retardant (G-2).

Phenylenebis(diphenyl phosphate) (manufactured by Daihachi Chemical Industry Co., Ltd., "CR-733S", mass average molecular weight: 574, catalogue value) was used as a phosphoric acid ester-based flame retardant (G-3).

Triphenyl phosphate (manufactured by Daihachi Chemical Industry Co., Ltd., "TPP", mass average molecular weight: 326, catalogue value) was used as a phosphoric acid ester-based flame retardant (G-4).

Flame Retardant Auxiliary Agent (H)

Polytetrafluoroethylene (PTFE) was used as a flame retardant auxiliary agent (H).

Examples 1 to 33, Comparative Examples 1 to 8

Each of the components was blended as indicated in Tables 1 to 7, and then kneaded using a twin-screw extruder, thereby obtaining a pellet of the reinforced thermoplastic resin composition. The resulting pellet was dried at 100° C. for 3 hours, and then moldabilty thereof was evaluated by injection molding, Charpy impact strength, flexural strength, flexural modulus, weld strength, heat resistance and warpage of the resulting molded articles were measured. The evaluation results are shown in tables 1 to 7.

TABLE 1

| | | | | EXAMPLE 1 | EXAMPLE 2 | EXAMPLE 3 | EXAMPLE 4 | EXAMPLE 5 | EXAMPLE 6 | EXAMPLE 7 |
|---|---|---|---|---|---|---|---|---|---|---|
| REINFORCED THERMOPLASTIC RESIN COMPOSITION | C [%] | A | A-1 | 50 | 80 | 80 | 100 | 95 | 95 | 95 |
| | | B | B-1 | 0 | 0 | 0 | 0 | 0 | 0 | 0 |
| | | [%] | B-2 | 0 | 0 | 0 | 0 | 0 | 0 | 0 |
| | | | B-3 | 0 | 0 | 0 | 0 | 0 | 0 | 0 |
| | | | B-4 | 50 | 20 | 20 | 0 | 5 | 5 | 5 |
| | | D | D-1 | 0 | 0 | 0 | 0 | 34.2 | 0 | 0 |
| | | [PARTS] | D-2 | 28.5 | 28.5 | 28.7 | 111.9 | 0 | 34.2 | 58.6 |
| | | | D-3 | 0 | 0 | 0 | 0 | 0 | 0 | 0 |
| | | | D-4 | 0 | 0 | 0 | 0 | 0 | 0 | 0 |
| | | | D-5 | 0 | 0 | 0 | 0 | 0 | 0 | 0 |
| | | E | E-1 | 0 | 0 | 0 | 0 | 0 | 0 | 0 |
| | | [PARTS] | E-2 | 8 | 8 | 8 | 8 | 8 | 8 | 8 |
| | | | E-3 | 0 | 0 | 0 | 0 | 0 | 0 | 0 |
| | | | E-4 | 0 | 0 | 0 | 0 | 0 | 0 | 0 |
| | | | E-5 | 0 | 0 | 0 | 0 | 0 | 0 | 0 |
| | | | E-6 | 0 | 0 | 0 | 0 | 0 | 0 | 0 |
| | | F | F-1 | 5 | 5 | 5 | 5 | 5 | 5 | 5 |
| | | [PARTS] | F-2 | 0 | 0 | 0 | 0 | 0 | 0 | 0 |
| | | | F-3 | 0 | 0 | 0 | 0 | 0 | 0 | 0 |
| | | | F-4 | 0 | 0 | 0 | 0 | 0 | 0 | 0 |
| | | G | G-1 | 0 | 0 | 0 | 0 | 0 | 0 | 0 |
| | | [PARTS] | G-2 | 0 | 0 | 1 | 23 | 23 | 23 | 23 |
| | | | G-3 | 0 | 0 | 0 | 0 | 0 | 0 | 0 |
| | | | G-4 | 0 | 0 | 0 | 0 | 0 | 0 | 0 |
| | | H [PARTS] | H-1 | 0.8 | 0.8 | 0.8 | 0.8 | 0.8 | 0.8 | 0.8 |
| | PROPORTION OF COMPONENT (D) [%] | | | 20 | 20 | 20 | 45 | 20 | 20 | 30 |
| EVALUATION | CHARPY IMPACT STRENGTH [kJ/m$^2$] | | | 11 | 13 | 13 | 17 | 13 | 13 | 16 |
| | FLEXURAL STRENGTH [MPa] | | | 134 | 159 | 162 | 267 | 253 | 184 | 232 |
| | FLEXURAL MODULUS [MPa] | | | 5100 | 6100 | 6300 | 14400 | 14100 | 7100 | 11000 |
| | WELD STRENGTH [N] | | | 139 | 144 | 144 | 190 | 167 | 160 | 172 |
| | DEFLECTION TEMPERATURE [° C.] | | | 100 | 131 | 129 | 100 | 92 | 92 | 96 |
| | MOLDABILITY | | | ◎ | ◎ | ◎ | ○ | ◎ | ◎ | ◎ |
| | WARPAGE | | | ○ | ○ | ○ | ○ | ○ | ○ | ○ |

TABLE 2

|  |  |  |  | EXAMPLE 8 | EXAMPLE 9 | EXAMPLE 10 | EXAMPLE 11 | EXAMPLE 12 | EXAMPLE 13 | EXAMPLE 14 |
|---|---|---|---|---|---|---|---|---|---|---|
| REINFORCED THERMOPLASTIC RESIN COMPOSITION | C | A [%] | A-1 | 95 | 95 | 95 | 95 | 95 | 95 | 95 |
|  |  | B [%] | B-1 | 0 | 0 | 0 | 0 | 0 | 5 | 0 |
|  |  |  | B-2 | 0 | 0 | 0 | 0 | 0 | 0 | 5 |
|  |  |  | B-3 | 0 | 0 | 0 | 0 | 0 | 0 | 0 |
|  |  |  | B-4 | 5 | 5 | 5 | 5 | 5 | 0 | 0 |
|  | D [PARTS] |  | D-1 | 0 | 0 | 0 | 0 | 0 | 0 | 0 |
|  |  |  | D-2 | 111.9 | 136.8 | 0 | 0 | 0 | 111.9 | 111.9 |
|  |  |  | D-3 | 0 | 0 | 111.9 | 0 | 0 | 0 | 0 |
|  |  |  | D-4 | 0 | 0 | 0 | 111.9 | 0 | 0 | 0 |
|  |  |  | D-5 | 0 | 0 | 0 | 0 | 111.9 | 0 | 0 |
|  | E [PARTS] |  | E-1 | 0 | 0 | 0 | 0 | 0 | 0 | 0 |
|  |  |  | E-2 | 8 | 8 | 8 | 8 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | F [PARTS] |  | F-1 | 5 | 5 | 5 | 5 | 5 | 5 | 5 |
|  |  |  | F-2 | 0 | 0 | 0 | 0 | 0 | 0 | 0 |
|  |  |  | F-3 | 0 | 0 | 0 | 0 | 0 | 0 | 0 |
|  |  |  | F-4 | 0 | 0 | 0 | 0 | 0 | 0 | 0 |
|  | G [PARTS] |  | G-1 | 0 | 0 | 0 | 0 | 0 | 0 | 0 |
|  |  |  | G-2 | 23 | 23 | 23 | 23 | 23 | 23 | 23 |
|  |  |  | G-3 | 0 | 0 | 0 | 0 | 0 | 0 | 0 |
|  |  |  | G-4 | 0 | 0 | 0 | 0 | 0 | 0 | 0 |
|  | H [PARTS] |  | H-1 | 0.8 | 0.8 | 0.8 | 0.8 | 0.8 | 0.8 | 0.8 |
|  | PROPORTION OF COMPONENT (D) [%] |  |  | 45 | 50 | 45 | 45 | 45 | 45 | 45 |
| EVALUATION | CHARPY IMPACT STRENGTH [kJ/m$^2$] |  |  | 20 | 19 | 15 | 13 | 11 | 19 | 19 |
|  | FLEXURAL STRENGTH [MPa] |  |  | 263 | 278 | 252 | 230 | 216 | 255 | 260 |
|  | FLEXURAL MODULUS [MPa] |  |  | 14500 | 15600 | 14200 | 14000 | 13700 | 14500 | 14400 |
|  | WELD STRENGTH [N] |  |  | 188 | 193 | 177 | 163 | 156 | 182 | 187 |
|  | DEFLECTION TEMPERATURE [° C.] |  |  | 98 | 98 | 98 | 98 | 97 | 98 | 97 |
|  | MOLDABILITY |  |  | ◎ | ○ | ◎ | ◎ | ◎ | ◎ | ◎ |
|  | WARPAGE |  |  | ○ | ○ | ○ | ○ | ○ | ○ | ○ |

TABLE 3

|  |  |  |  | EXAMPLE 15 | EXAMPLE 16 | EXAMPLE 17 | EXAMPLE 18 | EXAMPLE 19 | EXAMPLE 20 | EXAMPLE 21 |
|---|---|---|---|---|---|---|---|---|---|---|
| REINFORCED THERMOPLASTIC RESIN COMPOSITION | C | A [%] | A-1 | 95 | 95 | 95 | 95 | 95 | 95 | 95 |
|  |  | B [%] | B-1 | 0 | 0 | 0 | 0 | 0 | 0 | 0 |
|  |  |  | B-2 | 0 | 0 | 0 | 0 | 0 | 0 | 0 |
|  |  |  | B-3 | 5 | 0 | 0 | 0 | 0 | 0 | 0 |
|  |  |  | B-4 | 0 | 5 | 5 | 5 | 5 | 5 | 5 |
|  | D [PARTS] |  | D-1 | 0 | 0 | 0 | 0 | 0 | 0 | 0 |
|  |  |  | D-2 | 111.9 | 106.2 | 107.8 | 113.6 | 93.9 | 95.6 | 113.6 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 0 | 0 | 0 | 0 | 0 |
|  | E [PARTS] |  | E-1 | 0 | 0 | 0 | 0 | 0 | 0 | 0 |
|  |  |  | E-2 | 8 | 1 | 3 | 10 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | F [PARTS] |  | F-1 | 5 | 5 | 5 | 5 | 5 | 5 | 5 |
|  |  |  | F-2 | 0 | 0 | 0 | 0 | 0 | 0 | 0 |
|  |  |  | F-3 | 0 | 0 | 0 | 0 | 0 | 0 | 0 |
|  |  |  | F-4 | 0 | 0 | 0 | 0 | 0 | 0 | 0 |
|  | G [PARTS] |  | G-1 | 0 | 0 | 0 | 0 | 0 | 0 | 0 |
|  |  |  | G-2 | 23 | 23 | 23 | 23 | 1 | 3 | 25 |
|  |  |  | G-3 | 0 | 0 | 0 | 0 | 0 | 0 | 0 |
|  |  |  | G-4 | 0 | 0 | 0 | 0 | 0 | 0 | 0 |
|  | H [PARTS] |  | H-1 | 0.8 | 0.8 | 0.8 | 0.8 | 0.8 | 0.8 | 0.8 |
|  | PROPORTION OF COMPONENT (D) [%] |  |  | 45 | 45 | 45 | 45 | 45 | 45 | 45 |

TABLE 3-continued

|  |  | EXAMPLE 15 | EXAMPLE 16 | EXAMPLE 17 | EXAMPLE 18 | EXAMPLE 19 | EXAMPLE 20 | EXAMPLE 21 |
|---|---|---|---|---|---|---|---|---|
| EVALUATION | CHARPY IMPACT STRENGTH [kJ/m$^2$] | 19 | 12 | 14 | 20 | 24 | 23 | 19 |
|  | FLEXURAL STRENGTH [MPa] | 265 | 184 | 191 | 265 | 185 | 189 | 265 |
|  | FLEXURAL MODULUS [MPa] | 14400 | 14100 | 14200 | 14600 | 10600 | 10800 | 14700 |
|  | WELD STRENGTH [N] | 189 | 140 | 152 | 191 | 202 | 199 | 187 |
|  | DEFLECTION TEMPERATURE [° C.] | 98 | 98 | 98 | 99 | 128 | 124 | 95 |
|  | MOLDABILITY | ◎ | ◎ | ◎ | ○ | ○ | ◎ | ◎ |
|  | WARPAGE | ○ | ○ | ○ | ○ | ○ | ○ | ○ |

TABLE 4

|  |  |  |  | EXAMPLE 22 | EXAMPLE 23 | EXAMPLE 24 | EXAMPLE 25 | EXAMPLE 26 | EXAMPLE 27 | EXAMPLE 28 |
|---|---|---|---|---|---|---|---|---|---|---|
| REINFORCED THERMOPLASTIC RESIN COMPOSITION | C [%] | A | A-1 | 95 | 95 | 95 | 95 | 95 | 95 | 95 |
|  |  | B | B-1 | 0 | 0 | 0 | 0 | 0 | 0 | 0 |
|  |  |  | B-2 | 0 | 0 | 0 | 0 | 0 | 0 | 0 |
|  |  |  | B-3 | 0 | 0 | 0 | 0 | 0 | 0 | 0 |
|  |  |  | B-4 | 5 | 5 | 5 | 5 | 5 | 5 | 5 |
|  | D [PARTS] |  | D-1 | 0 | 0 | 0 | 0 | 0 | 0 | 0 |
|  |  |  | D-2 | 111.9 | 111.9 | 111.9 | 111.9 | 111.9 | 108.7 | 110.3 |
|  |  |  | D-3 | 0 | 0 | 0 | 0 | 0 | 0 | 0 |
|  |  |  | D-4 | 0 | 0 | 0 | 0 | 0 | 0 | 0 |
|  |  |  | D-5 | 0 | 0 | 0 | 0 | 0 | 0 | 0 |
|  | E [PARTS] |  | E-1 | 0 | 0 | 0 | 0 | 0 | 0 | 0 |
|  |  |  | E-2 | 8 | 8 | 8 | 8 | 8 | 8 | 8 |
|  |  |  | E-3 | 0 | 0 | 0 | 0 | 0 | 0 | 0 |
|  |  |  | E-4 | 0 | 0 | 0 | 0 | 0 | 0 | 0 |
|  |  |  | E-5 | 0 | 0 | 0 | 0 | 0 | 0 | 0 |
|  |  |  | E-6 | 0 | 0 | 0 | 0 | 0 | 0 | 0 |
|  | F [PARTS] |  | F-1 | 5 | 5 | 5 | 0 | 0 | 1 | 3 |
|  |  |  | F-2 | 0 | 0 | 0 | 5 | 0 | 0 | 0 |
|  |  |  | F-3 | 0 | 0 | 0 | 0 | 5 | 0 | 0 |
|  |  |  | F-4 | 0 | 0 | 0 | 0 | 0 | 0 | 0 |
|  | G [PARTS] |  | G-1 | 23 | 0 | 0 | 0 | 0 | 0 | 0 |
|  |  |  | G-2 | 0 | 0 | 0 | 23 | 23 | 23 | 23 |
|  |  |  | G-3 | 0 | 23 | 0 | 0 | 0 | 0 | 0 |
|  |  |  | G-4 | 0 | 0 | 23 | 0 | 0 | 0 | 0 |
|  | H [PARTS] |  | H-1 | 0.8 | 0.8 | 0.8 | 0.8 | 0.8 | 0.8 | 0.8 |
|  | PROPORTION OF COMPONENT (D) [%] |  |  | 45 | 45 | 45 | 45 | 45 | 45 | 45 |
| EVALUATION | CHARPY IMPACT STRENGTH [kJ/m$^2$] |  |  | 19 | 20 | 20 | 18 | 16 | 19 | 20 |
|  | FLEXURAL STRENGTH [MPa] |  |  | 258 | 260 | 261 | 266 | 264 | 251 | 256 |
|  | FLEXURAL MODULUS [MPa] |  |  | 14300 | 14300 | 14300 | 14500 | 14700 | 14500 | 14500 |
|  | WELD STRENGTH [N] |  |  | 188 | 187 | 186 | 194 | 154 | 131 | 137 |
|  | DEFLECTION TEMPERATURE [° C.] |  |  | 98 | 97 | 95 | 98 | 98 | 99 | 98 |
|  | MOLDABILITY |  |  | ◎ | ◎ | ○ | ◎ | ◎ | ◎ | ◎ |
|  | WARPAGE |  |  | ○ | ○ | ○ | ○ | ○ | ○ | ○ |

TABLE 5

|  |  |  |  | EXAMPLE 29 | EXAMPLE 30 | EXAMPLE 31 | EXAMPLE 32 | EXAMPLE 33 |
|---|---|---|---|---|---|---|---|---|
| REINFORCED THERMOPLASTIC RESIN COMPOSITION | C [%] | A | A-1 | 95 | 95 | 95 | 95 | 95 |
|  |  | B | B-1 | 0 | 0 | 0 | 0 | 0 |
|  |  |  | B-2 | 0 | 0 | 0 | 0 | 0 |
|  |  |  | B-3 | 0 | 0 | 0 | 0 | 0 |
|  |  |  | B-4 | 5 | 5 | 5 | 5 | 5 |
|  | D [PARTS] |  | D-1 | 0 | 0 | 0 | 0 | 0 |
|  |  |  | D-2 | 116.0 | 120.1 | 111.9 | 111.9 | 111.9 |
|  |  |  | D-3 | 0 | 0 | 0 | 0 | 0 |
|  |  |  | D-4 | 0 | 0 | 0 | 0 | 0 |
|  |  |  | D-5 | 0 | 0 | 0 | 0 | 0 |
|  | E [PARTS] |  | E-1 | 0 | 0 | 8 | 0 | 0 |
|  |  |  | E-2 | 8 | 8 | 0 | 0 | 0 |

TABLE 5-continued

|  |  |  | EXAMPLE 29 | EXAMPLE 30 | EXAMPLE 31 | EXAMPLE 32 | EXAMPLE 33 |
|---|---|---|---|---|---|---|---|
|  |  | E-3 | 0 | 0 | 0 | 8 | 0 |
|  |  | E-4 | 0 | 0 | 0 | 0 | 8 |
|  |  | E-5 | 0 | 0 | 0 | 0 | 0 |
|  |  | E-6 | 0 | 0 | 0 | 0 | 0 |
|  | F [PARTS] | F-1 | 10 | 15 | 5 | 5 | 5 |
|  |  | F-2 | 0 | 0 | 0 | 0 | 0 |
|  |  | F-3 | 0 | 0 | 0 | 0 | 0 |
|  |  | F-4 | 0 | 0 | 0 | 0 | 0 |
|  | G [PARTS] | G-1 | 0 | 0 | 0 | 0 | 0 |
|  |  | G-2 | 23 | 23 | 23 | 23 | 23 |
|  |  | G-3 | 0 | 0 | 0 | 0 | 0 |
|  |  | G-4 | 0 | 0 | 0 | 0 | 0 |
|  | H [PARTS] | H-1 | 0.8 | 0.8 | 0.8 | 0.8 | 0.8 |
|  | PROPORTION OF COMPONENT (D) [%] |  | 45 | 45 | 45 | 45 | 45 |
| EVALUATION | CHARPY IMPACT STRENGTH [kJ/m$^2$] |  | 20 | 19 | 20 | 20 | 20 |
|  | FLEXURAL STRENGTH [MPa] |  | 272 | 271 | 273 | 270 | 270 |
|  | FLEXURAL MODULUS [MPa] |  | 14600 | 14500 | 14400 | 14300 | 14300 |
|  | WELD STRENGTH [N] |  | 186 | 158 | 186 | 188 | 185 |
|  | DEFLECTION TEMPERATURE [° C.] |  | 98 | 99 | 98 | 98 | 98 |
|  | MOLDABILITY |  | ⊚ | ⊚ | ⊚ | ⊚ | ⊚ |
|  | WARPAGE |  | ○ | ○ | ○ | ○ | ○ |

TABLE 6

|  |  |  |  | COMPARATIVE EXAMPLE 1 | COMPARATIVE EXAMPLE 2 | COMPARATIVE EXAMPLE 3 | COMPARATIVE EXAMPLE 4 |
|---|---|---|---|---|---|---|---|
| REINFORCED THERMOPLASTIC RESIN COMPOSITION | C [%] | A | A-1 | 45 | 100 | 95 | 95 |
|  |  | B [%] | B-1 | 0 | 0 | 0 | 0 |
|  |  |  | B-2 | 0 | 0 | 0 | 0 |
|  |  |  | B-3 | 0 | 0 | 0 | 0 |
|  |  |  | B-4 | 55 | 0 | 5 | 5 |
|  | D [PARTS] |  | D-1 | 0 | 0 | 0 | 0 |
|  |  |  | D-2 | 0 | 167.2 | 105.4 | 107.8 |
|  |  |  | D-3 | 0 | 0 | 0 | 0 |
|  |  |  | D-4 | 0 | 0 | 0 | 0 |
|  |  |  | D-5 | 27.9 | 0 | 0 | 0 |
|  | E [PARTS] |  | E-1 | 0 | 0 | 0 | 0 |
|  |  |  | E-2 | 8 | 8 | 0 | 8 |
|  |  |  | E-3 | 0 | 0 | 0 | 0 |
|  |  |  | E-4 | 0 | 0 | 0 | 0 |
|  |  |  | E-5 | 0 | 0 | 0 | 0 |
|  |  |  | E-6 | 0 | 0 | 0 | 0 |
|  | F [PARTS] |  | F-1 | 5 | 5 | 5 | 0 |
|  |  |  | F-2 | 0 | 0 | 0 | 0 |
|  |  |  | F-3 | 0 | 0 | 0 | 0 |
|  |  |  | F-4 | 0 | 0 | 0 | 0 |
|  | G [PARTS] |  | G-1 | 0 | 0 | 0 | 0 |
|  |  |  | G-2 | 0 | 23 | 23 | 23 |
|  |  |  | G-3 | 0 | 0 | 0 | 0 |
|  |  |  | G-4 | 0 | 0 | 0 | 0 |
|  | H [PARTS] |  | H-1 | 0.8 | 0.8 | 0.8 | 0.8 |
|  | PROPORTION OF COMPONENT (D) [%] |  |  | 20 | 55 | 45 | 45 |
| EVALUATION | CHARPY IMPACT STRENGTH [kJ/m$^2$] |  |  | 9 | 18 | 11 | 19 |
|  | FLEXURAL STRENGTH [MPa] |  |  | 129 | 279 | 205 | 255 |
|  | FLEXURAL MODULUS [MPa] |  |  | 4900 | 16200 | 14100 | 14600 |
|  | WELD STRENGTH [N] |  |  | 133 | 199 | 124 | 99 |
|  | DEFLECTION TEMPERATURE [° C.] |  |  | 93 | 99 | 98 | 99 |
|  | MOLDABILITY |  |  | ⊚ | X | ⊚ | ⊚ |
|  | WARPAGE |  |  | ○ | ○ | ○ | ○ |

TABLE 7

| | | | | COMPARATIVE EXAMPLE 5 | COMPARATIVE EXAMPLE 6 | COMPARATIVE EXAMPLE 7 | COMPARATIVE EXAMPLE 8 |
|---|---|---|---|---|---|---|---|
| REINFORCED THERMOPLASTIC RESIN COMPOSITION | C | A [%] | A-1 | 95 | 95 | 95 | 95 |
| | | B [%] | B-1 | 0 | 0 | 0 | 0 |
| | | | B-2 | 0 | 0 | 0 | 0 |
| | | | B-3 | 0 | 0 | 0 | 0 |
| | | | B-4 | 5 | 5 | 5 | 5 |
| | D [PARTS] | | D-1 | 0 | 0 | 0 | 0 |
| | | | D-2 | 140.8 | 124.2 | 111.9 | 111.9 |
| | | | D-3 | 0 | 0 | 0 | 0 |
| | | | D-4 | 0 | 0 | 0 | 0 |
| | | | D-5 | 0 | 0 | 0 | 0 |
| | E [PARTS] | | E-1 | 0 | 0 | 0 | 0 |
| | | | E-2 | 0 | 8 | 8 | 0 |
| | | | E-3 | 0 | 0 | 0 | 0 |
| | | | E-4 | 0 | 0 | 0 | 0 |
| | | | E-5 | 0 | 0 | 0 | 8 |
| | | | E-6 | 12 | 0 | 0 | 0 |
| | F [PARTS] | | F-1 | 5 | 20 | 0 | 5 |
| | | | F-2 | 0 | 0 | 0 | 0 |
| | | | F-3 | 0 | 0 | 0 | 0 |
| | | | F-4 | 0 | 0 | 5 | 0 |
| | G [PARTS] | | G-1 | 0 | 0 | 0 | 0 |
| | | | G-2 | 23 | 23 | 23 | 23 |
| | | | G-3 | 0 | 0 | 0 | 0 |
| | | | G-4 | 0 | 0 | 0 | 0 |
| | H [PARTS] | | H-1 | 0.8 | 0.8 | 0.8 | 0.8 |
| | PROPORTION OF COMPONENT (D) [%] | | | 50 | 45 | 45 | 45 |
| EVALUATION | CHARPY IMPACT STRENGTH [kJ/m$^2$] | | | 21 | 18 | 19 | 9 |
| | FLEXURAL STRENGTH [MPa] | | | 284 | 270 | 262 | 260 |
| | FLEXURAL MODULUS [MPa] | | | 15200 | 14300 | 14300 | 14400 |
| | WELD STRENGTH [N] | | | 197 | 109 | 122 | 179 |
| | DEFLECTION TEMPERATURE [° C.] | | | 99 | 99 | 88 | 98 |
| | MOLDABILITY | | | X | ⊚ | ⊚ | ⊚ |
| | WARPAGE | | | ○ | X | ○ | ○ |

The amount of the inorganic filler (D), glycidyl ether unit-containing polymer (E), a polyamide (F), phosphoric acid ester-type flame retardant (G), flame retardant auxiliary agent (H) is the amount (parts) with respect to the 100 parts of the resin main component. The "proportion of component (D)" is the amount of the inorganic filler (D) with respect to 100% by mass of the reinforced thermoplastic resin composition.

As shown in Tables 1 to 7, the reinforced thermoplastic resin composition obtained in each of examples exhibited excellent moldablity. From the reinforced thermoplastic resin composition obtained in each of examples, a molded article could be obtained, which exhibited excellent weld strength, rigidity, impact resistance, mechanical strength, heat resistance, and in which warpage caused by moisture absorption was suppressed.

On the other hand, in Comparative examples 1 to 8, any one of moldability of the reinforced thermoplastic resin composition, weld strength, rigidity, impact strength, mechanical strength and heat resistance of the molded article was inferior to that of Examples.

Specifically, in the case of Comparative Example 1 in which the amount of a polycarbonate resin (A) was too small, and the amount of a graft copolymer (B) was too large, impact strength was deteriorated.

In the case of Comparative Example 2 in which the amount of an inorganic filler (D) was too large, moldability was deteriorated.

In the case of Comparative Example 3 in which a glycidyl ether unit-containing polymer (E) was not contained, impact strength, mechanical strength and weld strength were deteriorated.

In the case of Comparative Example 4 in which a polyamide (F) was not contained, weld strength was deteriorated.

In the case of Comparative Example 5 in which the mass average molecular weight of a glycidyl ether unit-containing polymer (E) was 70,200, moldability was deteriorated.

In the case of Comparative Example 6 in which the amount of a polyamide (F) was too large, weld strength was deteriorated. Further, warpage caused by moisture absorption was generated.

In the case of Comparative Example 7 in which the moisture percentage of a polyamide (F) was 0.2, weld strength and heat resistance were deteriorated.

In the case of Comparative Example 8 in which the mass average molecular weight of a glycidyl ether unit-containing polymer (E) was 1,650, impact strength was deteriorated.

Based on the comparison between Example 8 and Comparative Example 3, it was confirmed that the reinforced thermoplastic resin composition of the present invention was superior in impact strength, mechanical strength and weld strength of molded article to the reinforced thermoplastic resin composition in which a glycidyl ether unit-containing polymer (E) was not included.

Based on the comparison between Example 8 and Comparative Example 4, it was confirmed that the reinforced thermoplastic resin composition of the present invention was superior in weld strength of the molded article to the reinforced thermoplastic resin composition in which a polyamide having a moisture percentage of 0.1% or more was not included.

Based on the comparison between Example 8 and Comparative Example 7, it was confirmed that the reinforced thermoplastic resin composition of the present invention was superior in weld strength and heat resistance of the molded article to the reinforced thermoplastic resin composition in which a polyamide having a moisture percentage of greater than 0.1% was included.

INDUSTRIAL APPLICABILITY

The reinforced thermoplastic resin composition of the present invention is particularly useful for a raw material of the housing of mobile devices (such as notebook-type or tablet-type personal computer, a mobile phone such as a smartphone, a digital camera, a digital video camera and the like).

What is claimed is:

1. A reinforced thermoplastic resin composition comprising:
    a resin main component (C) consisting of 50 to 100% by mass of a polycarbonate resin (A) and 0 to 50% by mass of a graft copolymer (B) obtainable by polymerization of a monomer mixture containing an aromatic alkenyl compound monomer (a) and a vinyl cyanide compound monomer (b) in the presence of a rubber polymer (B1), provided that the total amount of the polycarbonate resin (A) and the graft copolymer (B) is 100% by mass;
    an inorganic filler (D);
    a glycidyl ether unit-containing polymer (E) that has a glycidyl ether unit and has the mass average molecular weight of 3,800 to 60,000, provided that the graft copolymer is excluded from the definition of the glycidyl ether unit-containing polymer (E); and
    a polyamide (F) that has a moisture percentage of 0.1% by mass or less; wherein the amount of the inorganic filler (D) with respect to 100% by mass of the reinforced thermoplastic resin composition is 20 to 50% by mass;
    the amount of the glycidyl ether unit-containing polymer (E) with respect to 100 parts by mass of the resin main component (C) is 1 to 10 parts by mass; and
    the amount of the polyamide (F) with respect to 100 parts by mass of the resin main component (C) is 1 to 15 parts by mass.

2. The reinforced thermoplastic resin composition according to claim 1, wherein a relative viscosity of the polyamide (F) is 1.5 to 4.5.

3. The reinforced thermoplastic resin composition according to claim 1, wherein the inorganic filler (D) is a carbon fiber.

4. The reinforced thermoplastic resin composition according to claim 1, wherein the inorganic filler (D) is a glass fiber.

5. The reinforced thermoplastic resin composition according to claim 1, further containing a phosphoric acid ester-type flame retardant (G).

6. The reinforced thermoplastic resin composition according to claim 5, wherein the mass average molecular weight of the phosphoric acid ester-type flame retardant (G) is greater than 326.

7. A molded article obtainable by molding the reinforced thermoplastic resin composition of claim 1.

* * * * *